United States Patent [19]

Krohn et al.

[11] Patent Number: 4,600,307
[45] Date of Patent: Jul. 15, 1986

[54] COHERENT RADIATION DETECTING APPARATUS

[75] Inventors: William T. Krohn, Danbury; Mark J. McNally, Wilton; Rene Abreu, Fairfield, all of Conn.

[73] Assignee: The Perkin-Elmer Corporation, Norwalk, Conn.

[21] Appl. No.: 518,729

[22] Filed: Jul. 29, 1983

[51] Int. Cl.[4] ............................................. G01J 9/02
[52] U.S. Cl. ................................... 356/346; 350/358; 356/352
[58] Field of Search ................. 356/346, 352; 350/358

[56] References Cited

U.S. PATENT DOCUMENTS

| | | |
|---|---|---|
| 3,668,558 | 6/1972 | Hunsinger ...................... 356/352 X |
| 3,824,018 | 7/1974 | Crane, Jr. . |
| 4,170,416 | 9/1979 | Fencil . |
| 4,222,667 | 9/1980 | Layne . |
| 4,309,108 | 1/1982 | Siebert . |

*Primary Examiner*—Davis L. Willis
*Assistant Examiner*—Matthew W. Koren
*Attorney, Agent, or Firm*—Thomas P. Murphy; Edwin T. Grimes; Francis L. Masselle

[57] ABSTRACT

This invention relates to unequal path interferometers which are adapted, among other possible uses, for use in detecting coherent radiation as from a laser in a packet of radiation including incoherent background radiation, which includes an unequal optical path length interferometer of the type in which portions of the radiation impinging on the interferometric component are caused to be recombined after travelling two different optical paths; the optical paths differing in length by an amount substantially greater than the coherence length of the non-coherent radiation but substantially less than the coherence length of the coherent radiation; the unequal optical path length interferometric component including a crystalline cell having anisotropic properties; circuitry for applying an ultrasonic sound wave to the crystalline cell to vary the effective index of refraction of the crystalline cell in a preselected systematic manner; a detector for detecting the intensity of the recombined portions and producing a signal representative thereof, said signal having a variable component caused by the varying constructive and destructive interference of the recombined coherent radiation components, while the recombined non-coherent radiation components produce only a substantially steady background signal.

7 Claims, 2 Drawing Figures

COHERENT RADIATION DETECTING APPARATUS

FIELD OF INVENTION

This invention relates to unequal path interferometers. Interferometers constructed according to the concepts of the invention are adapted, among other possible uses, for use in detecting coherent radiation, as from a laser, in a packet of radiation including incoherent background radiation.

This application is closely related to patent application entitled, "Apparatus for detecting Coherent Radiation and Unequal Path Interferometers", bearing Ser. No. 518,727 and filed on even date herewith.

Unequal path interferometers may take any one of a number of various different forms such as a Michelson or Fizeau, for example. A presently preferred form comprises a Fabry-Perot etalon.

BACKGROUND OF INVENTION

A Fabry-Perot etalon interferometer consists normally of two plane, parallel partially reflecting surfaces formed on a solid glass spacer so that one portion of incident radiation is transmitted directly through while other portions, being reflected between the partially reflecting surfaces before emerging, are transmitted over a longer path.

As described in U.S. Pat. No. 3,824,018, issued July 16, 1974, and assigned to the same assignee as the present application, a Fabry-Perot etalon is adapted to discriminate coherent radiation by making the optical thickness of the glass spacer sufficiently less than the absolute coherence length of the incident radiation (i.e. the absolute of the coherence length of the coherent and incoherent incident radiation) so that the absolute coherent length will be substantially less than the difference between the lengths of the paths of the directly and indirectly transmitted radiation (i.e. the optical path difference or OPD). Then, by changing the path length, by means of tilting the etalon, the intensity of the incoherent radiation transmitted will remain constant, but the coherent radiation modulates. The intensity of radiation transmitted through the etalon is a function of the OPD and of the wavelength of the radiation. The OPD is a function of the index of refraction of the spacer, of the thickness of the spacer and the angle of refraction of the radiation passing through the interior of the spacer. As the etalon is tilted in a scanning mode at a predetermined rate to vary the optical path lengths, and the OPD, the intensity of the transmitted radiation, suitably detected by a photodetector at the back of the etalon, varies in a manner such that the frequency of the radiation as picked up by the detector decreases and reaches a minimum as the etalon swings through a position at which the angle of incidence of the impinging radiation, and hence the angle of refraction is zero. By this means the etalon is utilized to detect the presence and the relative position of the source of the coherent radiation.

Other related patents in the field include U.S. Pat. Nos. 4,170,416 dated Oct. 9, 1979; 4,222,667 dated Sept. 16, 1980; and 4,309,108, dated Jan. 5, 1982. The present invention is intended as an improvement over the forgoing patents for particular installations.

SUMMARY OF THE INVENTION

Briefly, in one form thereof, the present invention is directed to new and improved apparatus for detecting the presence of coherent radiation in the presence of non-coherent ambient radiation which is characterized by an unequal optical path length interferometer of the type in which portions of the radiation impinging on the interferometric component are caused to be recombined after travelling two different optical paths. The optical paths differ in length by an amount substantially greater than the coherence length of the non-coherent radiation, but substantially less than the coherence length of the coherent radiation. The unequal optical path length interferometer component comprises a crystalline cell having anisotropic properties. Means are provided for applying an ultrasonic sound wave to the crystalline cell to vary the effective index of refraction of the crystalline cell in a preselected systematic manner. A detector serves to detect the intensity of the recombined portions and produces a signal representative thereof, said signal having a variable component caused by the varying constructive and destructive interference of the recombined coherent radiation components, while the recombined non-coherent radiation components produce only a substantially steady background signal. According to one aspect of the invention the crystalline cell is fabricated from one of the class of materials consisting of zinc selenide, quartz, silicon and calcium fluoride.

There has thus been outlined rather broadly the more important features of the invention in order that the detailed description thereof that follows may be better understood, and in order that the present contribution to the art may be better appreciated. There are, of course, additional features of the invention, that will be described hereinafter and which will form the subject of the claims appended hereto. Those skilled in the art will appreciate that the conception upon which this disclosure is based may readily be utilized as a basis for the designing of other apparatus for carrying out the several purposes of the invention. It is important, therefore, that the claims be regarded as including such equivalent apparatus as do not depart from the spirit and scope of the invention.

Specific embodiments of the invention have been chosen for purposes of illustration and description, and are shown in the accompanying drawings, forming a part of the specification.

DETAILED DESCRIPTION OF THE INVENTION

It will be appreciated that many different forms of unequal path interferometers may be employed to carry out the concepts of this invention such as, a Fabry-Perot Michelson or Fizeau, for example. However, it is necessary to provide means for varying the radiation or optical path difference, as will be explained more fully hereinafter. It has been found that a Fabry-Perot interferometer or etalon is particularly desirable for carrying out the invention.

In one form of the invention a Fabry-Perot interferometer or etalon is used for detecting the existence of a coherent source in the presence of incoherent background.

Figure 2:
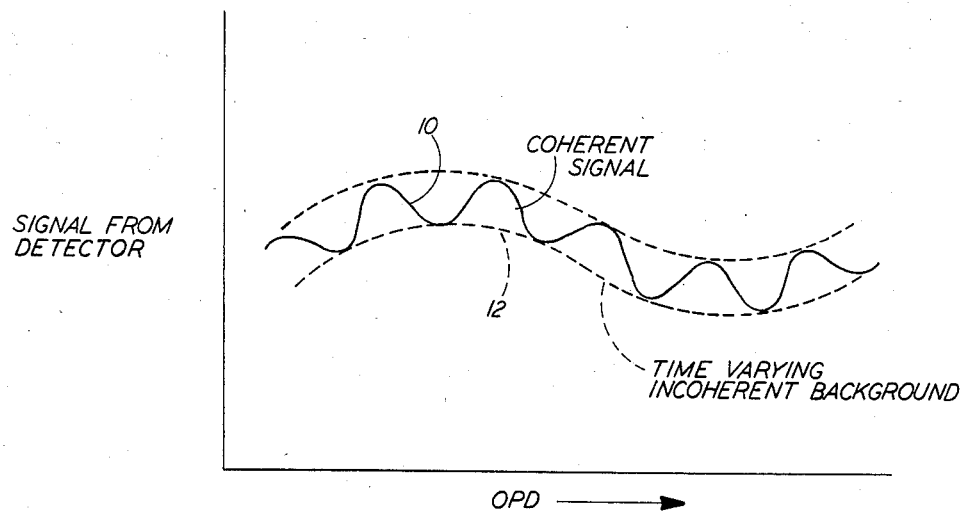
FIG. 2 is a schematic illustration of the wave forms produced by the detector of FIG. 1.

The background or incoherent illumination is not modulated by the Fabry-Perot etalon, but remains in the form of a "constant" illumination. That is, the transmission of the etalon will remain constant, independent of the optical path difference, i.e. independent of the angle, wavelength, and etalon thickness. However, for coherent illumination, the transmission of the etalon is a function of the optical path difference (OPD). As a result the coherent or laser radiation is modulated by the etalon while the background or incoherent radiation is substantially not modulated. This is illustrated in FIG. 2 wherein the detected signal is plotted as a function of the optical path difference (OPD). The modulated coherent signal is indicated at 10 and the substantially unmodulated incoherent background signal is indicated by the slowly changing dotted lines at 12.

The optical path difference OPD is derived from the following relationship:

$$OPD = 2\, n\, d\, \cos O'$$

where:

Cos O' is related to the angle of incidence,
n = index of refraction of etalon,
d = thickness of etalon.

Preselected constant etalon thickness and constant angle of incidence, depending upon the desired spectral range, are selected to allow such lasers to be modulated while still not modulating the background. Modulation is effected by varying the index of refraction (n) of the etalon in a controlled systematic manner. Thus, as seen in FIG. 2, the coherent signal is rapidly modulated directly in response to the change in the index of refraction, while the incoherent background merely varies slowly with time.

Figure 1:
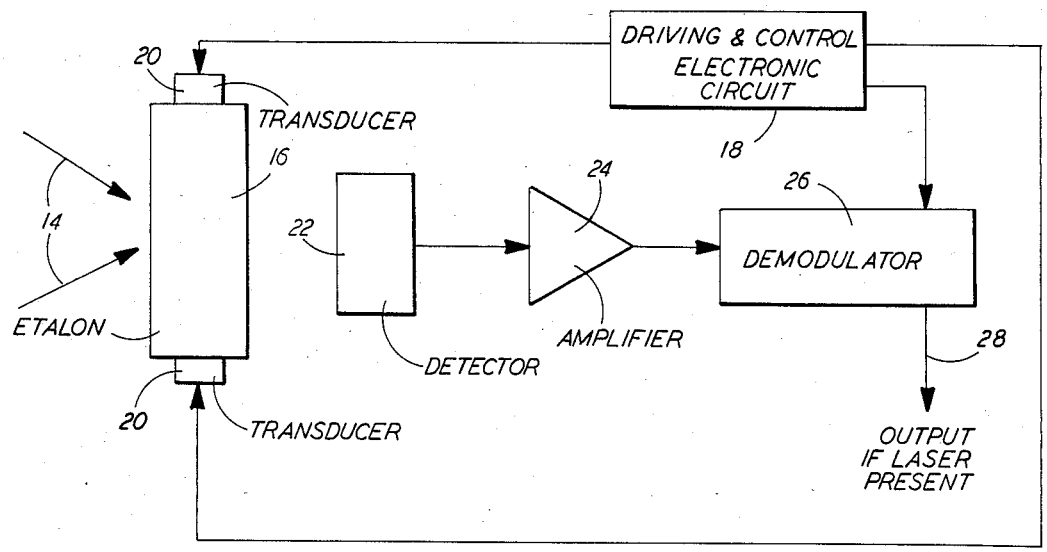
FIG. 1 is a schematic diagram of an etalon detector apparatus constructed according to the concepts of the present invention.

Referring to FIG. 1, radiation is received by the apparatus as indicated by arrows 14. This radiation is made up of incoherent radiation and possibly coherent radiation, the presence of which is being detected.

A crystalline etalon 16 is provided which is of optically transparent material over a wavelength range of interest and is polished as a low finesse Fabry-Perot etalon. Any suitable material exhibiting the optical transmission desired and the stress-optical coefficient necessary for photoelastic operation may be used for the etalon such as, for example, zinc selenide, quartz, silicon and calcium fluoride. The etalon is polished flat and parallel, and coated if necessary, to yield a low (3–8 typically but not exclusively) finesse over the clear aperture.

A driving and control electronic circuit 18 is provided for applying an ultrasonic sound wave to the crystalline cell 16 via transducers 20, provided for the purpose. The transducer elements are bonded to the etalon in such a manner that the application of an oscillating voltage will alternately stress and relax the etalon material. The stress-optical coefficients of the etalon material relate the index anisotropy which is produced to the stress which is applied. That is, the frequency is preselected for a certain type of laser being detected and is in resonance with the crystalline cell. It may, for example, be of the order of from about 30 to about 40 kilohertz.

The stressing and relaxing of the etalon by the sound wave in a periodic manner changes the density of the etalon and as a result changes the index of refraction and hence the optical path difference through the cell, which changes the transmission of the coherent, laser, light while the background light, being non-coherent, is not affected by this change in index to any significant extent. That is, the etalon selectively modulates only long coherence length (i.e.—laser) radiation.

Still referring to FIG. 1, the optical output or transmission from the crystalline cell 16 is monitored by an optical radiation detector 22, which provides an electric signal that is amplified by amplifier 24. This signal is inputted into a signal demodulator 26, which also receives a signal from the driving and control electronic circuit 18 that is responsive to the ultrasonic sound wave which modulates the crystalline cell 16. The function of the demodulator 26 is to detect the presence of a signal which is synchronous with the modulation signal. The presence of this synchronous signal corresponds to the presence of a laser and the result of this comparison is outputted at 28.

The concept of the present invention could also be used with stepped Fabry-Perot etalons.

It will thus be seen that the present invention does indeed provide new and improved apparatus for detecting the presence of coherent radiation in the presence of non-coherent ambient radiation which uses little power, has a large aperture and a wide field of view and is broad band in its coverage. Although specific embodiments have been illustrated and described, it will be obvious to those skilled in the art that various modifications may be made without departing from the spirit and scope of the invention which is to be limited solely by the appended claims.

What is claimed is:

1. Apparatus for detecting the presence of coherent radiation in the presence of non-coherent ambient radiation comprising:

an unequal optical path length interferometer of the type in which portions of the radiation impinging on the interferometric componenet are caused to be recombined after travelling two different optical paths;

said optical paths differing in length by an amount substantially greater than the coherence length of the non-coherent radiation but substantially less than the coherence length of the coherent radiation;

said unequal optical path length interferometric component comprising a crystalline cell having anisotropic porperties;

means for applying an ultrasonic sound wave to said crystalline cell to vary the effective index of refraction of said crystalline cell in a preselected systematic manner; and means for detecting the intensity of said recombined portions and producing a signal representative thereof, said signal having a variable component caused by the varying constructive and destructive interference of the recombined coherent radiation components, while the recombined non-coherent radiation components produce only a substantially steady background signal.

2. Apparatus according to claim 1 wherein said unequal optical path length interferometric component is a Fabry-Perot etalon.

3. Apparatus according to claim 1 wherein said crystalline cell is fabricated from one of the class of materials consisting of zinc selenide, quartz, silicon and calcium fluoride.

4. Apparatus according to claim 1 wherein said crystalline cell is fabricated from zinc selenide.

5. Apparatus according to claim 1 wherein said crystalline cell is fabricated from quartz.

6. Apparatus according to claim 1 wherein said crystalline cell is fabricated from silicon.

7. Apparatus according to claim 1 wherein said crystalline cell is fabricated from calcium fluoride.

* * * * *